United States Patent
Rzepkowski et al.

(10) Patent No.: US 6,512,530 B1
(45) Date of Patent: Jan. 28, 2003

(54) SYSTEMS AND METHODS FOR MIMICKING AN IMAGE FORMING OR CAPTURE DEVICE CONTROL PANEL CONTROL ELEMENT

(75) Inventors: Kristinn R. Rzepkowski, Rochester, NY (US); Thomas J. Perry, Pittsford, NY (US); Joseph G. Rouhana, Rochester, NY (US); John M. Pretino, Macedon, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,268

(22) Filed: Jan. 19, 2000

(51) Int. Cl.[7] .................................................. G06F 3/00
(52) U.S. Cl. ........................ 345/833; 345/764; 345/840; 345/773
(58) Field of Search ................................. 345/440, 764, 345/771, 773, 784, 786, 787, 833, 846

(56) References Cited

U.S. PATENT DOCUMENTS

| | | | | |
|---|---|---|---|---|
| 5,559,301 A | * | 9/1996 | Bryan, Jr. et al. | ...... 345/833 X |
| 5,615,347 A | * | 3/1997 | Davis et al. | ........... 345/833 |
| 5,640,595 A | * | 6/1997 | Baugher et al. | ......... 710/10 |
| 5,751,285 A | * | 5/1998 | Kashiwagi et al. | ...... 345/833 |
| 6,331,864 B1 | * | 12/2001 | Coco et al. | ........ 345/771 X |

* cited by examiner

*Primary Examiner*—John Cabeca
*Assistant Examiner*—X. L. Bautista
(74) *Attorney, Agent, or Firm*—Oliff & Berridge, PLC

(57) ABSTRACT

A graphical user interface widget includes a vertically-oriented slider portion. The slider portion includes a slider pointer that indicates a current value of the slider and a slider bar that indicates the default value of the slider. The bottom and top edges of the slider portion are labeled with the extreme values of the range for the variable associated with the slider portion. The slider pointer divides the slider portion into two subportions. An appearance of a bottom subportion of the slider portion is altered to reflect the value currently indicated by the slider pointer relative to the extreme values of the range represented by the slider. A numerical portion can be provided along with the slider portion. The numeral portion includes a value display portion and a pair of buttons that are used to increase or decrease the numerical value in the value display portion. When the value display portion is provided, the number in the value display portion is linked to the slider pointer, such that changing the slider pointer causes the number displayed in the value display portion to change accordingly. Similarly, changing the number in the value display portion causes a corresponding change in the position of the slider pointer relative to the slider portion.

42 Claims, 7 Drawing Sheets

SYSTEMS AND METHODS FOR MIMICKING AN IMAGE FORMING OR CAPTURE DEVICE CONTROL PANEL CONTROL ELEMENT

BACKGROUND OF THE INVENTION

1. Field of Invention

This invention is directed to a graphical user interface for an image capture device or an image forming device.

2. Description of Related Art

Scanners and other types of image capture devices, and digital copiers and other image forming devices, have become ubiquitous office productivity tools for generating electronic images of physical original documents or generating physical copies of electronic images. Once an electronic image has been generated, either from scratch or from a physical original document, the electronic image data can be used in an infinite variety of ways to increase the productivity and the product quality of an office. Such image capture devices include desktop scanners, other stand alone scanners, digital still cameras, digital video cameras, the scanning input portions of digital copiers, facsimile machines and other multi-function devices that are capable of generating electronic image data from an original document, and the like. These image capture devices can also include image databases that store previously captured electronic image data. Such image forming devices include digital copiers, laser printers, ink jet printers, color ink jet printers, and the like.

However, as the costs of these various image capture devices and image forming device have dropped and the output quality of the physical copies and the captured electronic image data has improved, these image capture devices and image forming devices have been provided with an ever increasing number of controllable features. Similarly, as users have become comfortable with capturing and using electronic image data obtained from original documents to create physical copies, the uses to which the electronic image data has been put, and thus the needed control over the quality and appearance of the electronic image data and the physical copies, have expanded greatly.

SUMMARY OF THE INVENTION

The ever-increasing numbers of features provided by these various image capturing devices and image forming devices cause users of these devices to find it increasingly difficult to obtain the desired results. Often, this is because, instead of having a control panel that has physical control elements, these devices often are controlled primarily through a graphical user interface. This graphical user interface can be accessed through a display and selection panel of the device. More often, however, the graphical user interfaces are accessed through a general purpose computer having a display device and one or more input devices.

While even unsophisticated users of these devices find it easy and intuitive to use the physical control elements on the control panel to control complex functions of even complex devices that have such a control panel, even users familiar with the various common widgets of graphical user interfaces find it difficult and non-intuitive to use these graphical user interface widgets to control even simple functions of these devices.

This invention thus provides systems, methods and graphical user interfaces that mimic the control elements of a control panel of an image forming or capture device.

In various exemplary embodiments of the systems, methods, and graphical user interfaces according to this invention, a graphical user interface widget includes a vertically-oriented slider portion. The slider portion includes a slider pointer that indicates a current value of the slider and a slider bar that indicates the default value of the slider. The bottom and top edges of the slider portion are labeled with the extreme values of the range for the variable associated with the slider portion. In particular, the slider pointer divides the slider portion into two subportions. An appearance of a bottom subportion of the slider portion is altered to reflect the value currently indicated by the slider pointer relative to the extreme values of the range represented by the slider.

Additionally, in some exemplary embodiments, a numerical portion is provided along with the slider portion. The numeral portion includes a value display portion and a pair of buttons that are used to increase or decrease the numerical value in the value display portion. When the value display portion is provided, the number in the value display portion is linked to the slider pointer, such that changing the slider pointer causes the number displayed in the value display portion to change accordingly. Similarly, changing the number in the value display portion causes a corresponding change in the position of the slider pointer relative to the slider portion.

These and other features and advantages of this invention are described in or are apparent from the following detailed description of various embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The control panel mimic graphical user interface widget and the systems, methods and graphical user interfaces according to this invention are particularly useful with the graphical user interfaces disclosed in U.S. patent applications Ser. Nos. 09/487,273, 09/487,274, 09/487,272, 09/487, 271, 09/487,582, 09/487,266 and 09/487,269, filed on even date herewith and each incorporated herein by reference in its entirety.

However, it should be appreciated that the control panel mimic graphical user interface and the systems, methods and graphical user interfaces of this invention can be used in place of any known or later developed slider in any known or later developed graphical user interface. Accordingly, it should be appreciated that, while the following discussion discloses a particular use for the control panel mimic graphical user interface widget according to the invention, such references are exemplary only, and should not be construed as limiting the scope of this invention.

Figure 1:
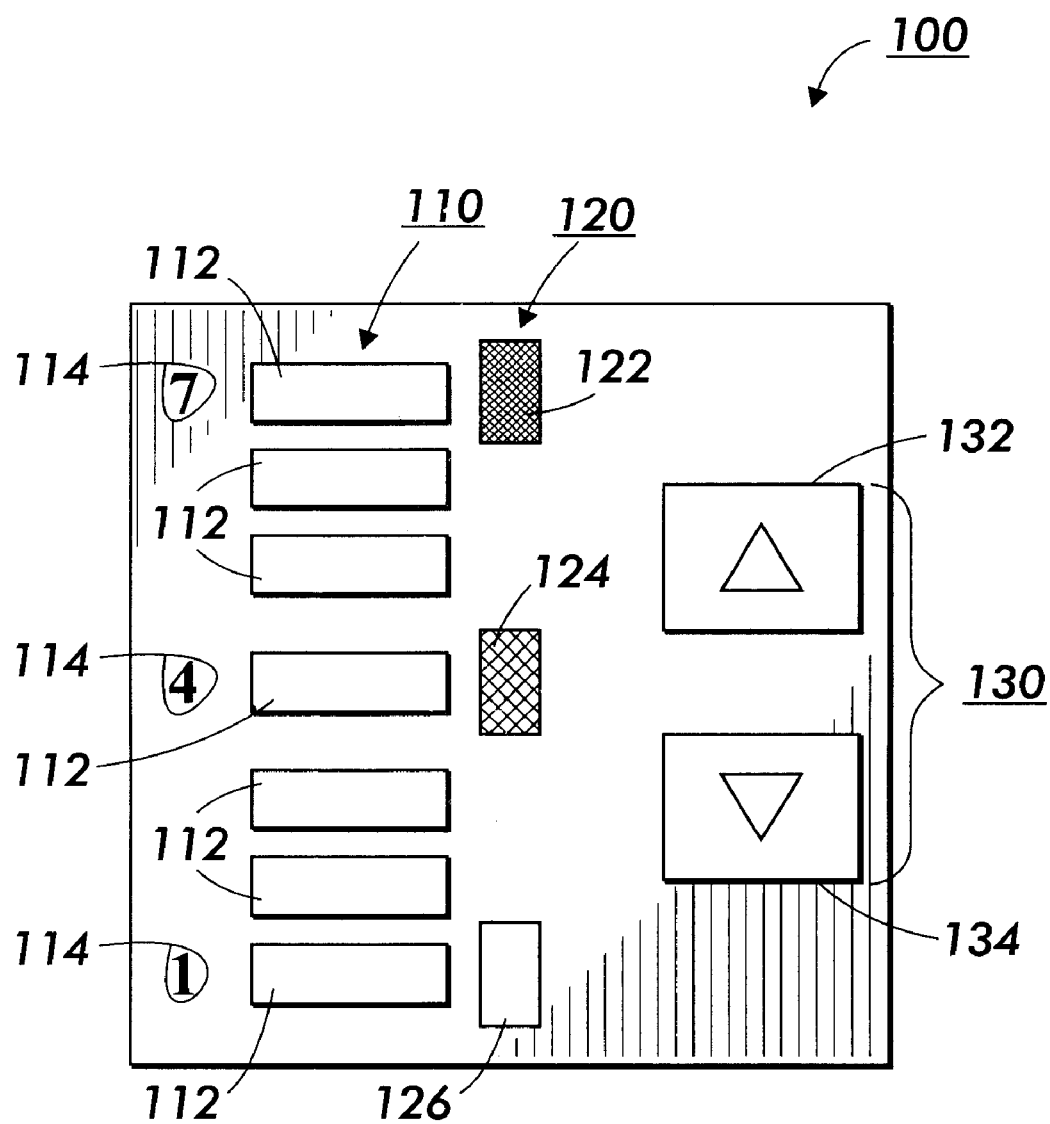
FIG. 1 illustrates a conventional control element of a control panel of an image forming or capture device.

FIG. 1 illustrates a first exemplary embodiment of a conventional control panel control element 100. As shown in FIG. 1, the conventional control element 100 includes a indicator portion 110, a visual cue portion 120 and a control device portion 130. In particular, the indicator portion 110 includes a number of indicator devices 112 and a number of numerical indicators 114. The numerical indicators 114 give a numerical cue to the user so the user can intuitively grasp the relative values represented by the indicator devices 112 of the indicator portion 110. It should be appreciated that the indicator devices 112 can be any known or later developed device for providing a visual indication of the selected value to the user. For example, the indicator devices can be light emitting diodes, liquid crystal devices, organic light emitting diodes, or any other known or later developed device capable of providing a visual indication to the user. It should also be appreciated that the indicator devices 112 can provide, in addition to, or instead of, the visual indication, either tactile or audio indications.

The visual cue portion 120 provides a number of visual cues 122, 124 and 126 to the user that represent the effects of selecting a particular value, as indicated by one of the indicator devices 112, to be applied by this control element 110. In particular, in the exemplary embodiment of the control element 100 shown in FIG. 1, the control element 100 is used to lighten or darken an output document relative to an input document. For example, the input document could be a original document to be scanned while the output document is a captured electronic image. In contrast, the original document could be an electronic document to be printed and the output document could be the printed physical copy of the electronic image. Finally, the original document could be a document to be photocopied while the output document is the photocopy.

In particular, the visual cue 122 indicates that the control values associated with the top three indicator devices 112 cause the output document to be darker than the input document. In contrast, the visual cue 126 indicates that the control values associated with the bottom three indicator devices 112 cause the output document to be lighter than the input document. Finally, the visual cue 124 indicates that the control value associated with the middle indicator device 112 causes the output document to have the same lightness or darkness as the input document.

The control portion 130 includes an increase control value button 132 and a decrease control value button 134. Pressing the increase control value button 132 causes the current control value, as represented by an activated one of the indicator devices 112, to be replaced with the next higher value, in accordance with the numerical visual cues 114. In contrast, pressing the decrease control value button 134 causes the current control value, as indicated by the activated one of the indicator devices 112, to be replaced with the next lower control value. Of course, it should be appreciated that, if the relative numerical values of the numerical visual cues 114 are reversed, the increase control value key 132 would actually decrease the control value, while the decrease control value button 134 would actually increase the control value.

Figure 2:
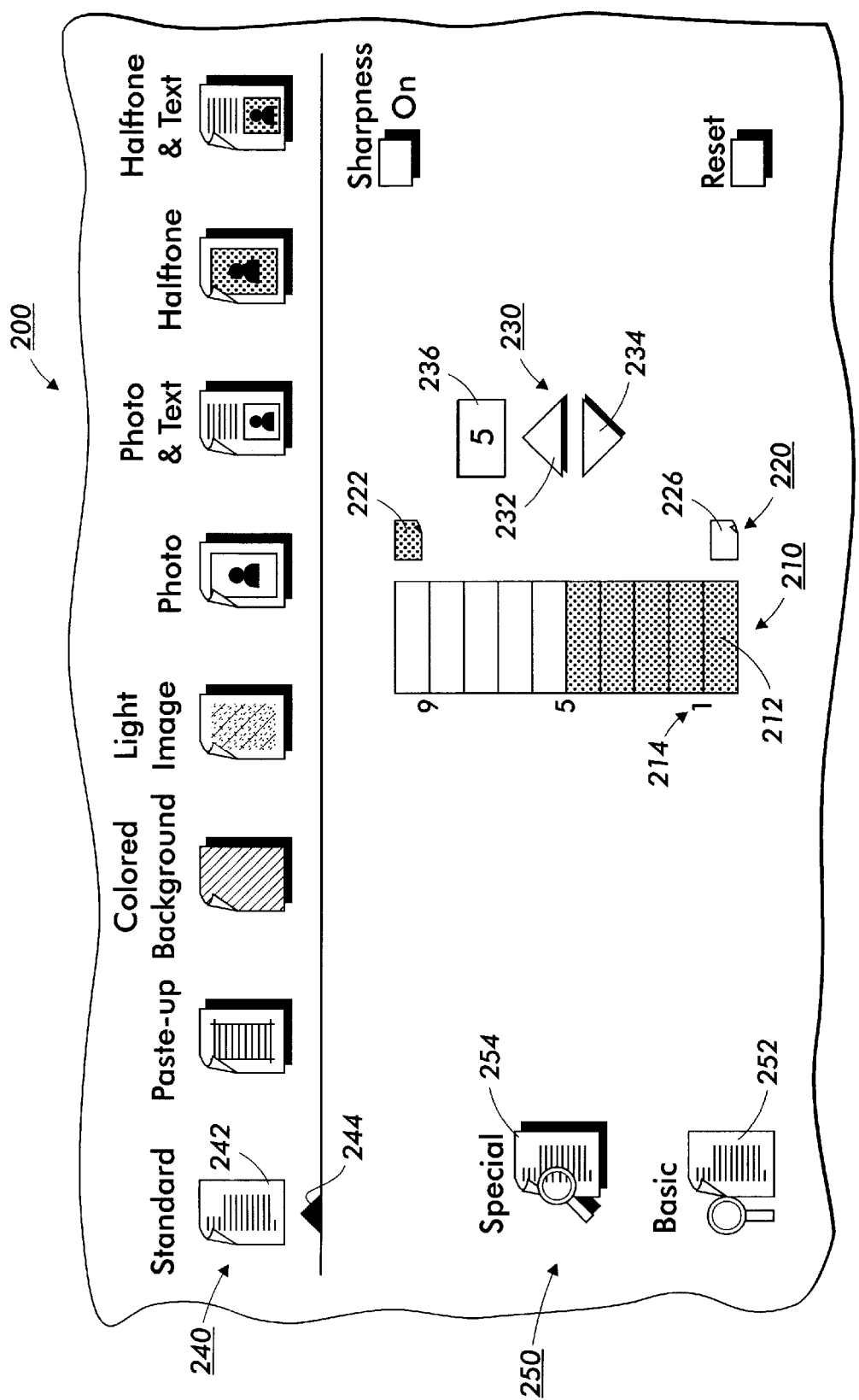
FIG. 2 is a second exemplary embodiment of a control element of a graphical control panel of an image forming or capture device.

FIG. 2 illustrates a second conventional control element of a graphical control panel 200. In particular, it should be appreciated that the graphical control panel 200 can be displayed on a touch screen or other display device of a control panel of a image capture or forming device.

As shown in FIG. 2, the control panel 200 includes an indicator portion 210, a visual cue portion 220 and a control device portion 230, as in the exemplary embodiment of the control element 100 shown in FIG. 1. The control panel 200 also includes a function selection portion 240 and a fiction menu selection portion 250.

In particular, as shown in FIG. 2, the indicator portion 210 includes a plurality of visual indicators 212 and a number of numerical visual cues 214. The visual cue portion 220 includes a pair of visual cues 222 and 226. In particular, the visual cue 222 represents that an output image will be darker than the input image, while the visual cue 226 indicates that the output image will be lighter than the input image. Like the control device portion 130 of the control element 100, the control device portion 230 of the control panel 200 includes an increase value control button 232 and a decrease control value button 234. The control device portion 230 also includes a numerical portion 236 that numerically indicates the control value that is visually indicated by the visual indicators 212 of the indicator portion 210.

In particular, as the increase and decrease control value buttons 232 and 234 are operated, the numerical value in the numerical portion 236 respectively increases or decreases. At the same time, the particular ones of the visual indicators 212 that are above or below the control value take on different visual appearances. As shown in FIG. 2, the indicator portions 212 that represent control values below the current selected control value, as represented by the number in the numerical portion 236, are given a gray color, while the visual indicators 212 that represent numerical values above the currently selected control value are given a white appearance.

The function selection portion 240 includes a plurality of function selection elements 242 that can be selected. When selected, the control elements displayed in the control panel 200 will change depending on the particular variables associated with the different selection elements 242. The selector 244 is used to indicate which of the function selection elements 242 is currently active. The function menu selection portion 250 allows the user to select between a basic menu selector 252 and an advanced menu selector 254. The basic menu selector 252 causes the function selection elements 242 to be displayed in the function selection portion 240, while the advanced menu selector 254 causes an advance set of function elements (not shown) to be displayed in the function selection portion 240.

Figure 3:
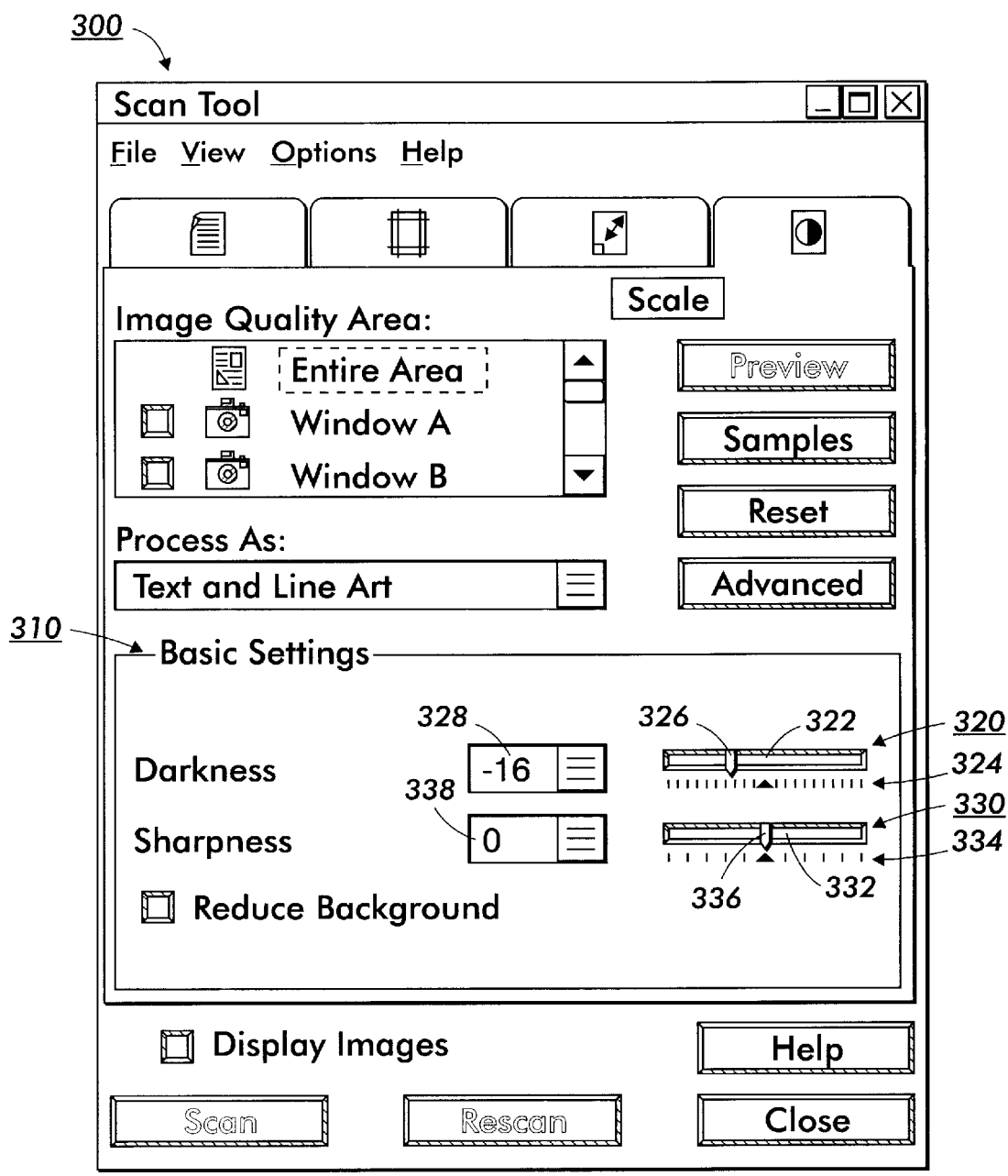
FIG. 3 is an exemplary embodiment of a conventional set of graphical user interface sliders.

In contrast to the conventional control panels and the control elements shown in FIGS. 1 and 2, FIG. 3 illustrates one exemplary embodiment of a conventional graphical user interface 300. In particular, this conventional graphical user interface includes a conventional slider portion 310. The slider portion 310 includes sliders for two different control elements 320 and 330. In particular, the control element 320 represents the darkness of an electronic image to be captured by scanning an original document, while the control element 330 represents the relative sharpness of the electronic image relative to the sharpness of the original document.

As shown in FIG. 3, the control portion 320 includes a slider bar 332 and an associated range scale 324, relative to which the user can move a slider pointer 326. The control portion 320 also includes a numerical display box 328 that displays the numerical value corresponding to the position of the slider pointer 326 relative to the range represented by the scale 324.

Similarly, the control portion 330 includes a second slider bar 332 and a second scale 334 relative to which the user can move a second pointer 336. Like the control portion 320, the control portion 330 includes a numerical display box 338 that displays the numerical value corresponding to the position of the pointer 336 relative to the scale 334.

Figure 5:
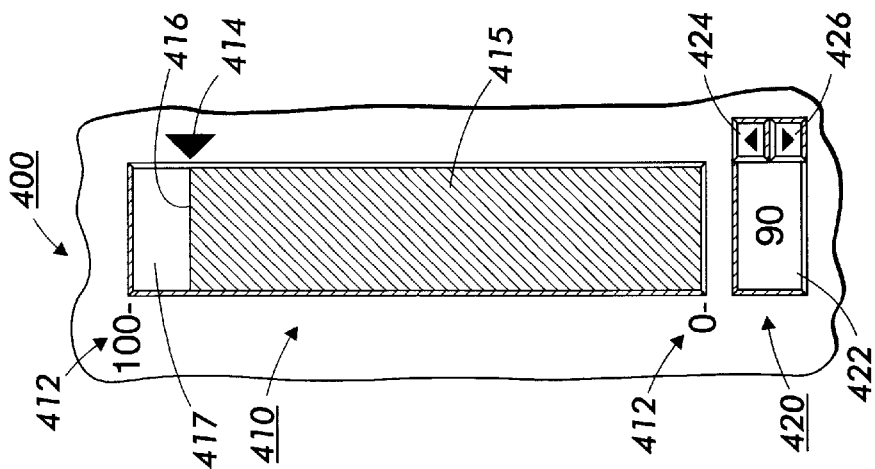
FIG. 5 shows the first exemplary embodiment of the control panel mimic graphical user interface widget according to this invention in a second state.
Figure 4:
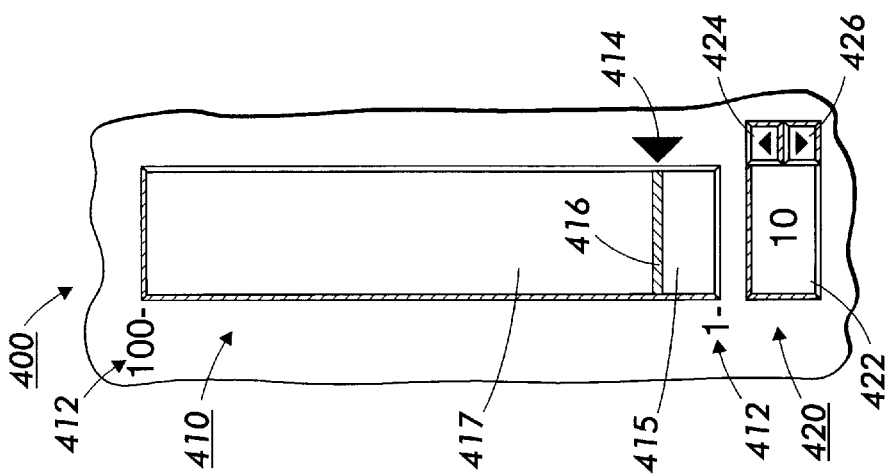
FIG. 4 is a first exemplary embodiment of the control panel mimic graphical user interface widget according to this invention in a first state.

FIGS. 4 and 5 show one exemplary embodiments of a control panel mimic graphical user interface widget 400 according to this invention. In particular, the control panel mimic graphical user interface widget 400 shown in FIG. 4 is in a first state, while the control panel mimic graphical user interface widget 400 shown in FIG. 5 is in a second state.

As shown in FIGS. 4 and 5, the control panel mimic graphical user interface widget 400 includes a vertically-oriented slider portion 410. The slider portion 410 includes a slider pointer 414 and a default value indicator bar 416 in the slider portion 410 that informs the user of the default value for a bottom slider subportion 415. The bottom and top edges of the slider portion 410 are labeled with numerical indicators 412 that indicate the extreme values of the range for the control function associated with the slider portion 410. In particular, the slider pointer 414 divides the slider portion 410 into two subportions, the bottom subportion 415 that is below the slider pointer 414 and a top subportion 417 that is above the slider pointer 414. An appearance of the bottom subportion 415 of the slider portion 410 is altered to reflect the value currently indicated by the position of the slider pointer 414 relative to the extreme values of the range represented by the slider portion 410.

Additionally, in the exemplary embodiment of the control panel mimic graphical user interface widget 400 according to this invention that is shown in FIGS. 4 and 5, a numerical portion 420 is provided along with the slider portion 410. The numeral portion 420 includes a value display portion 422 and a pair of increase and decrease buttons 424 and 426. The increase and decrease buttons 424 and 426 are used to increase or decrease the numerical value in the value display portion 422. When the value display portion 422 is provided, the number in the value display portion 422 is linked to the slider pointer 414. Thus, changing the position of the slider pointer 414 within the slider portion 410 causes the number displayed in the value display portion 422 to change accordingly. Similarly, in various other exemplary embodiments, changing the number in the value display portion 422 will cause a corresponding change in the position of the slider pointer 414 relative to the slider portion 410.

The exemplary embodiment of the control panel mimic graphical user interface widget 400 according to this invention shown in FIGS. 4 and 5 can be used, for example, to indicate the darkness/lightness or contrast of an output image relative to an input image, similarly to the control portions 320 and 330, or the control elements 110 and 210. The appearance of the bottom subportion can be altered depending on the type of function the widget 400 is associated with. Thus, for example, in the exemplary embodiment shown in FIGS. 4 and 5, the widget 400 is used to control the darkness or lightness of the output image, where the value 1 represents a maximum lightness of the output image and the value 100 represents the maximum darkness of the output image. Thus, as shown in FIGS. 4 and 5, when the slider pointer 414 is at the "10" value, the appearance of the bottom subportion 415 is relatively light. In contrast, when the slider pointer 414 is at the "90" value, the bottom subportion 415 is relatively dark.

Figure 6:
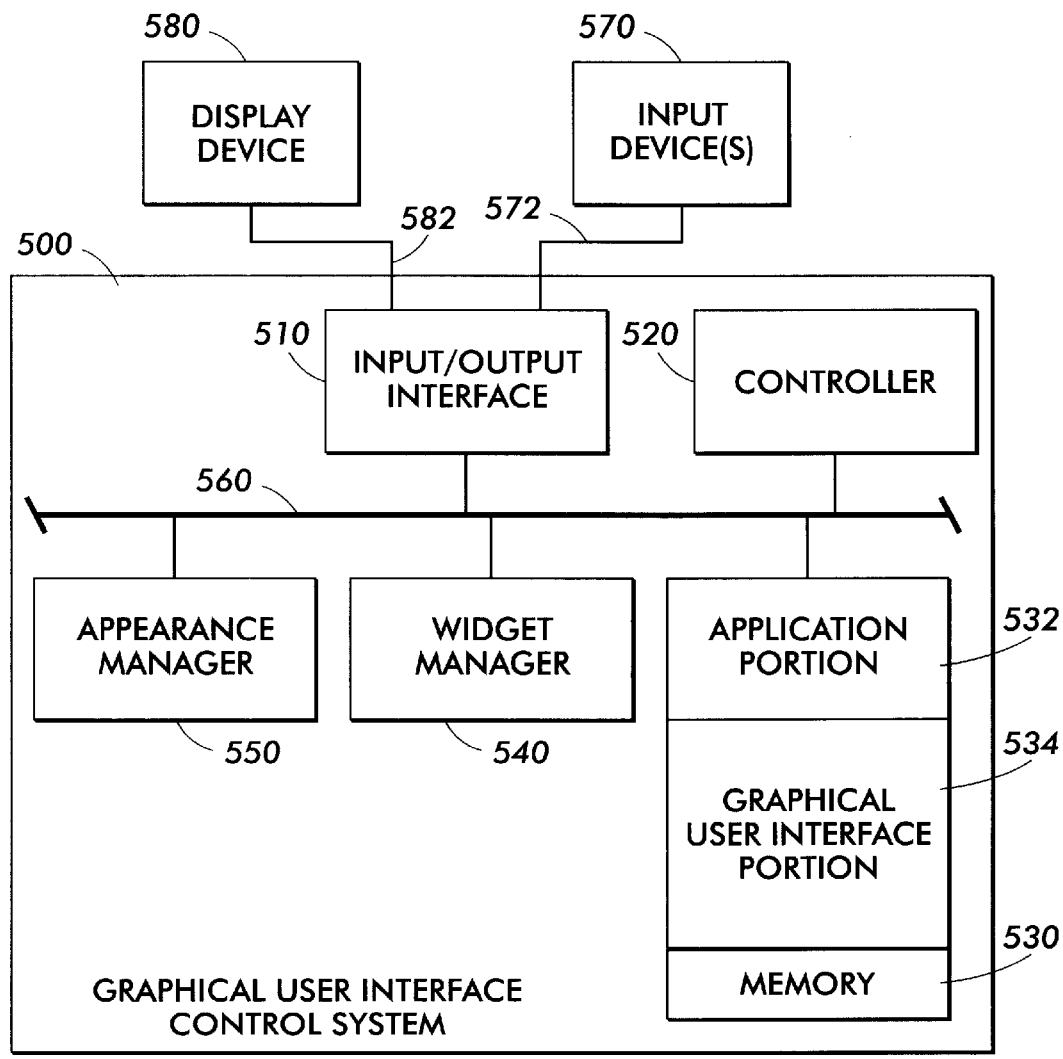
FIG. 6 is a block diagram illustrating one exemplary embodiment of the structural organization of a widget control system that is usable to control the control panel mimic graphical user interface widgets according to this invention.

FIG. 6 is a block diagram illustrating an exemplary embodiment of the structural organization of a widget control system 500 that is usable to control the control panel mimic graphical user interface widgets according to this invention. As shown in FIG. 6, the image capture device control system 500 includes an input/output interface 510, a controller 520, a memory 530, a widget manager 540 and an appearance manager 550, each interconnected by a data/control bus 560. One or more input devices 570 and a display device 580 are connected by links 572 and 582, respectively, to the input/output interface 510

The input device or devices 570 can include any one or more of a mouse, a keyboard, a touch pad, a track ball, a touch screen, or the like, or any other known or later developed device that is capable of inputting data and control signals over the link 572 to the input/output interface 510. Similarly, the display device 580 can be any known or later developed display device, including a cathode ray tube type monitor, a flat screen type monitor, an LCD monitor, or any other known or later developed device on which the graphical user interfaces according to this invention can be displayed and interacted with using one or more of the input devices 570.

The links 572 and 582 can be any known or later developed devices or systems that connect the one or more input devices 570 and the display device 580, respectively, to the image capture device control system 500, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems and/or devices. In general, the links 572 and 582 can each be any known or later developed connection systems or structures usable to connect the one or more input devices 570 and the display device 580, respectively, to the image capture device control system 500.

The memory 530 includes an application portion 532 in which an application program and any application files used by that application program can be stored. The graphical user interface portion 534 stores various graphical user interface widgets, including the control panel mimic graphical user interface widget 400 shown in FIGS. 4 and 5 and as described above.

In operation, the widget manager 540 of the graphical user interface widget control system 500, to display a particular instance of the control panel mimic graphical user interface widget, determines the control function which is to be controlled by this instance of the control panel mimic graphical user interface widget and the range of values this control function can take. The widget manager 540 then outputs to the display device 580 an image of the control panel mimic graphical user interface widget with the numerical indicators indicating the end values of the range. It should be appreciated that numerical indicators can indicate the actual end values. Alternatively, the numerical indicators can indicate the positions of the end values relative to the range on a percentage scale, where one end value is 0% and the other end value is 100%.

Then, the widget manager 540 determines the current and default values of the control function controlled by this instance of the control panel mimic graphical user interface widget. The widget manager 540 outputs an image of the slider pointer 414 and the slider bar 416 to the display device so that the slider pointer 414 and the slider bar 416 are positioned relative to the slider portion 410 according to the determined current value of the control function, and the default value of the control function, respectively, and the range of the values of the control function associated with this instance of the control panel mimic graphical user interface widget. If the numerical portion 420 is provided, the widget manager 540 outputs an image of the numerical portion indicating the numerical value of the control function.

The widget manager 540 also provides the current value of the control function and the range of values of the control function associated with this instance of the control panel mimic graphical user interface widget to the appearance manager 550. The appearance manager 550 then maps the current value of the control function and the range of values to determine an appearance of the bottom subportion 415. The appearance manager 550 outputs an image for the bottom subportion 415 according to the determined appearance to the display device 580. It should be appreciated that the appearance of the bottom subportion 415 can depend on the particular control function associated with this instance of the control panel mimic graphical user interface widget.

Figure 7A:
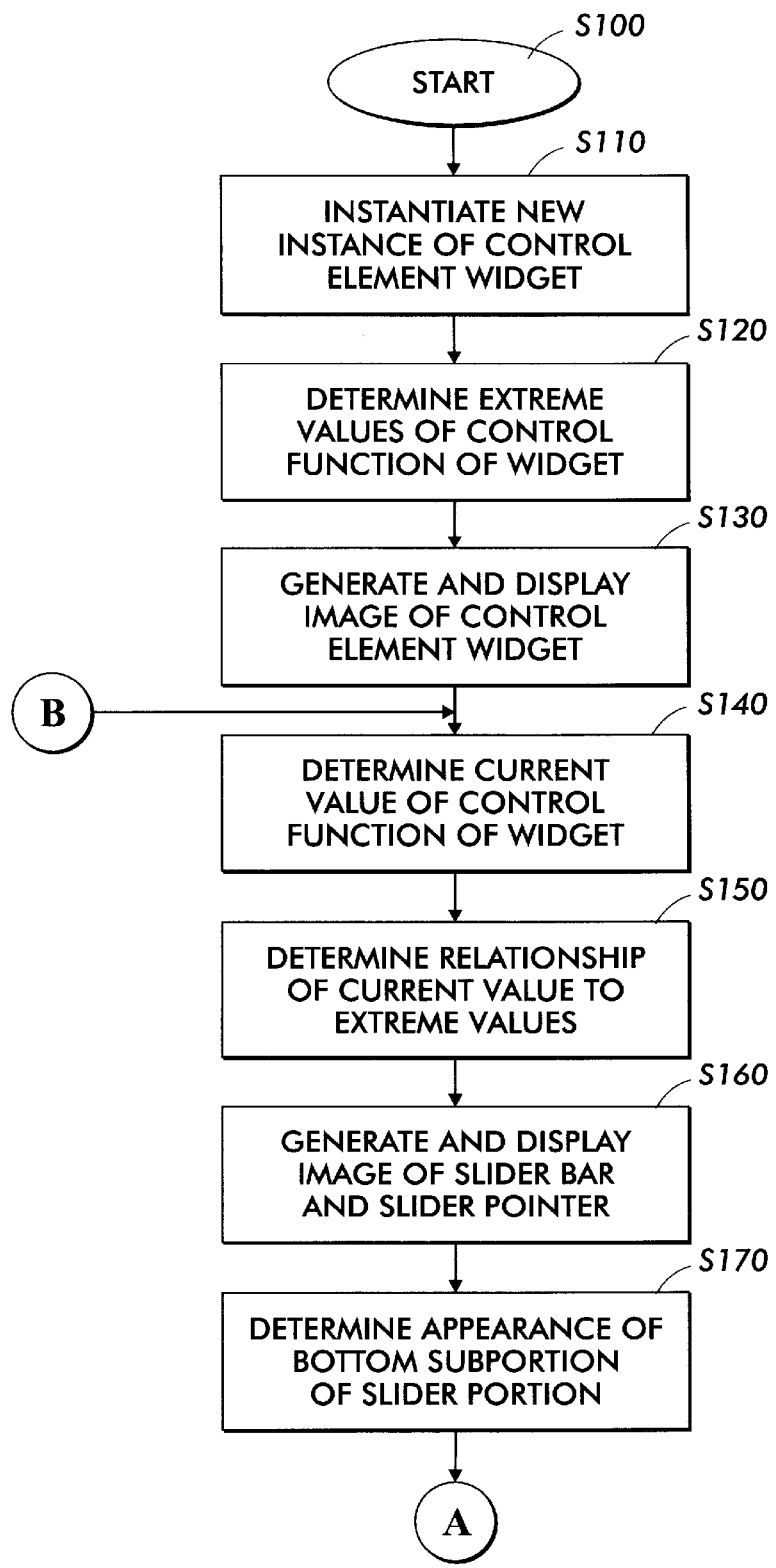
FIGS. 7A and 7B are a flowchart outlining one exemplary embodiment of a method for generating, displaying and using the control panel mimic graphical user interface widgets according to this invention.
Figure 7B:
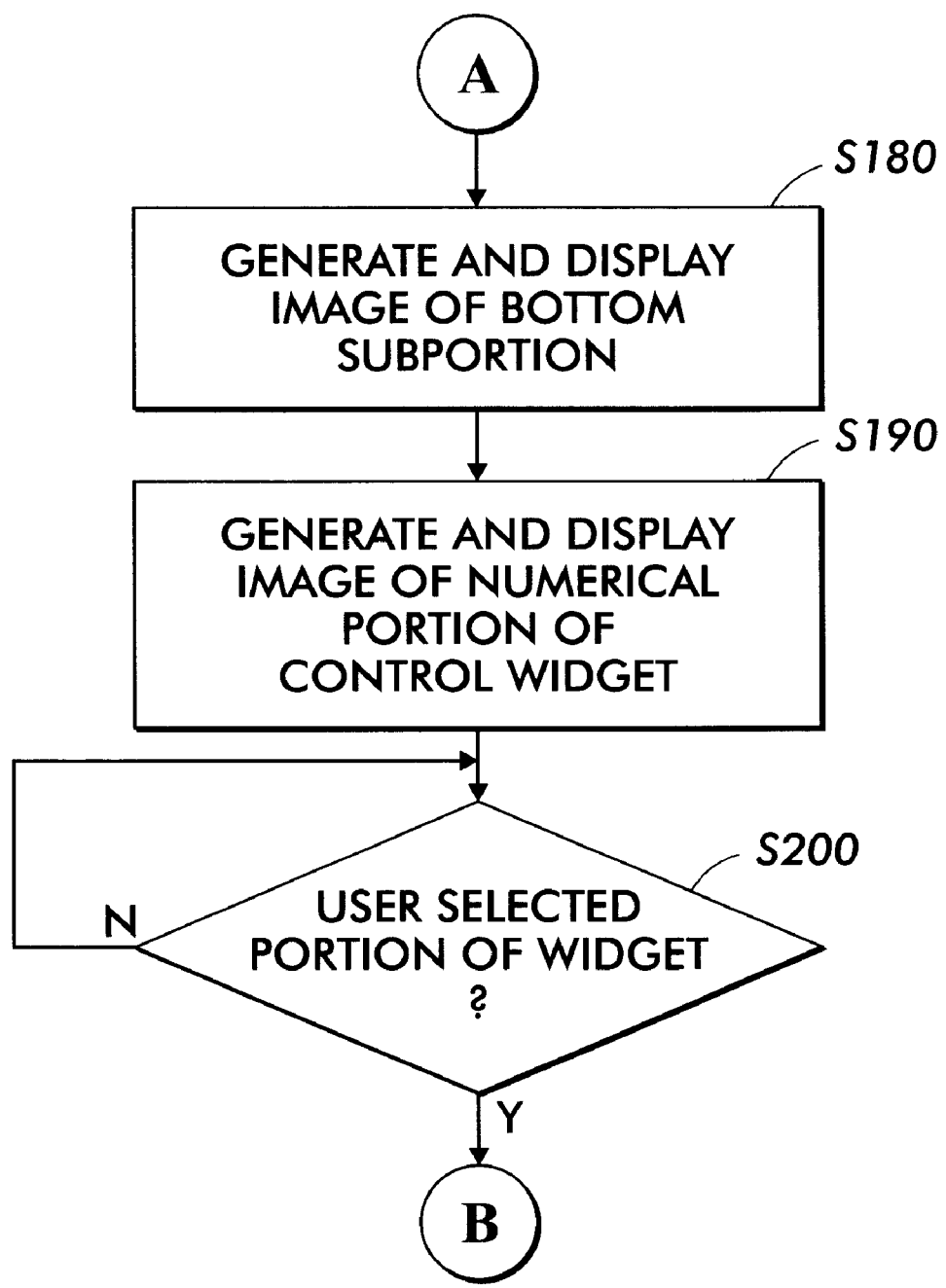

FIGS. 7A and 7B are a flowchart outlining one exemplary embodiment of a method for generating a graphical user interface widget according to this invention. Beginning in step S100, control continues to step S110, where a current instance of the control panel mimic graphical user interface widget is instantiated. In particular, as it is instantiated, in step S120, the extreme values for the control function associated with this instance of the control panel mimic graphical user interface widget are determined. Then, in step S130, an image of the control panel mimic graphical user interface widget, indicating these extreme end values, is generated and displayed. Control then continues to step S140.

In step S140, a current value and a default value for a control function associated with the current instance of the control panel mimic graphical user interface widget are determined. Next, in step S150, the relationships of the current value of this control function and the default value of this control function to the extreme ends of the range for this control function are determined. Then, in step S160, images of the slider pointer and of the slider bar are generated and displayed to place slider pointer and the slider bar at the appropriate relative positions relative to the slider portion between the extreme values based on the determined current value and the determined default value, respectively. Control then continues to step S170.

In step S170, the appearance for the bottom subportion of the slider portion is determined based on the extreme and current values of the control function and an appearance map that defines the different appearances the bottom subportion can take. Then, in step S180, an image of the bottom subportion is generated and displayed based on the determined appearance. Next, in step S190, an image of the numerical portion is generated and displayed based on the current value of the control function. Control then continues to step S200.

In step S200, a determination is made whether the user has selected the slider pointer or either of the increase or decrease buttons of the numerical portion. If so, control jumps back to step S140. Otherwise, control jumps back to step S200. Thus, the method continues indefinitely, or until this instance of the control panel mimic graphical user interface widget is released.

It should be appreciated that the graphical user interface widget control system 500 shown in FIG. 6 can be implemented on a general purpose computer. However, it should also be appreciated that the graphical user interface widget control system 500 shown in FIG. 6 can be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flowchart shown in FIGS. 7A and 7B, can be used to implement the graphical user interface widget control system 500

The memory 530 shown in FIG. 6 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the graphical user interface widget control system 500 shown in FIG. 6 can be implemented as portions of a suitably programmed general purpose computer. Alternatively, each of the elements shown in FIG. 5 can be implemented as physically distinct hardware circuits within a ASIC, or using a FPGA, a PLD, a PLA, or a PAL, or using discreet logic elements or discreet circuit elements. The particular form each of the elements of the graphical user interface widget control system 500 shown in FIG. 6 will take as a design choice and will be obvious and predictable to those skilled in the art.

Moreover, the graphical user interface widget control system 500 shown in FIG. 6 can be implemented as software executing on a programmed general purpose computer, a special purpose computer, a microprocessor or the like. In this case, the graphical user interface widget control system 500 shown in FIG. 6 can be implemented as routines embedded in a peripheral driver, as a resource residing on a server, or the like.

The graphical user interface widget control system 500 shown in FIG. 6 can be implemented by physically incorporating them into a software and/or hardware system, such as the hardware and software systems of a digital copier or the like.

While this invention has been described in conjunction with the exemplary embodiments outlined above, it is evident that many alternatives and modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A widget of a graphical user interface, the widget allowing a user to control an associated control function, the widget comprising:

a slider portion, a range of values of the associated control function associated with a vertical dimension of the slider portion;

a pair of numerical indicators, a first one of the pair of numerical indicators associated with a minimal value of the range of values and positioned relative to a bottom of the slider portion, a second one of the pair of numerical indicators associated with a maximal value of the range of values and positioned relative to a top of the slider portion;

a slider bar extending across the slider portion perpendicularly to the vertical dimension of the slider portion, the slider bar positioned along the vertical dimension of the slider portion based on a default value of the associated control function and the range of values;

a selectable slider pointer positioned adjacent to the slider portion, the slider pointer positioned along the vertical dimension of the slider portion based on a current value of the associated control function and the range of values, the slider pointer dividing the slider portion into a top subportion extending between a current position of the slider pointer relative to the slider portion and the top of the slider portion and a bottom subportion extending between a current position of the slider pointer relative to the slider portion and the bottom of the slider portion;

wherein an appearance of the bottom subportion of the slider portion is determined based on the current value of the associated control function and the range of values.

2. The widget of claim 1, wherein the current value of the control function can be altered by selecting the selectable slider pointer and altering the current position of the slider pointer relative to the slider portion.

3. The widget of claim 2, wherein the appearance of the bottom subportion of the slider portion changes when the current position of the slider pointer relative to the slider portion is altered.

4. The widget of claim 1, further comprising:

a numerical value display portion that displays a numerical value corresponding to the current value of the associated control function and the range of values;

an increase value button that increases the current value of the associated control function; and a decrease value button that decreases the current value of the associated control function.

5. The widget of claim 4, wherein:

the current value of the control function can be altered by selecting the selectable slider pointer and altering the current position of the slider pointer relative to the slider portion; and the numerical value displayed in the numerical value display portion changes when the current position of the slider pointer relative to the slider portion is altered.

6. The widget of claim 4, wherein:

the current value of the control function can be altered and the numerical value displayed in the numerical value display portion can be changed by selecting one of the increase and decrease buttons; and the current position of the slider pointer relative to the slider portion changes when the numerical value displayed in the numerical value display portion is changed.

7. The widget of claim 1, wherein the pair of numerical indicators indicate actual minimal and maximal values of the range of values.

8. The widget of claim 1, wherein the pair of numerical indicators indicate percentage values of the range of value relative to the minimal value of the range of values.

9. A graphical user interface comprising at least one of the widgets of claim 1.

10. The widget of claim 1, wherein the appearance of the bottom subportion of the slider portion is uniform within the bottom subportion and visually contrastable from the top subportion of the slider portion.

11. The widget of claim 1, wherein the appearance of the bottom subportion of the slider portion is a shading contrast from the top subportion of the slider portion.

12. A widget of a graphical user interface, the widget allowing a user to control an associated control function, the widget comprising:

a slider portion, a range of values of the associated control function associated with a vertical dimension of the slider portion;

a slider bar extending across the slider portion perpendicularly to the vertical dimension of the slider portion, the slider bar positioned along the vertical dimension of the slider portion based on a default value of the associated control function and the range of values;

a selectable slider pointer positioned adjacent to the slider portion, the slider pointer positioned along the vertical dimension of the slider portion based on a current value of the associated control function and the range of values, the slider pointer dividing the slider portion into a top subportion extending between a current position of the slider pointer relative to the slider portion and the top of the slider portion and a bottom subportion extending between a current position of the slider pointer relative to the slider portion and the bottom of the slider portion;

wherein an appearance of the bottom subportion of the slider portion is determined based on the current value of the associated control function and the range of values.

13. The widget of claim 12, wherein the current value of the control function can be altered by selecting the selectable slider pointer and altering the current position of the slider pointer relative to the slider portion.

14. The widget of claim 13, wherein the appearance of the bottom subportion of the slider portion changes when the current position of the slider pointer relative to the slider portion is altered.

15. The widget of claim 12, further comprising:

a numerical value display portion that displays a numerical value corresponding to the current value of the associated control function and the range of values;

an increase value button that increases the current value of the associated control function; and a decrease value button that decreases the current value of the associated control function.

16. The widget of claim 15, wherein:

the current value of the control function can be altered by selecting the selectable slider pointer and altering the current position of the slider pointer relative to the slider portion; and the numerical value displayed in the numerical value display portion changes when the current position of the slider pointer relative to the slider portion is altered.

17. The widget of claim 15, wherein:
the current value of the control function can be altered and the numerical value displayed in the numerical value display portion can be changed by selecting one of the increase and decrease buttons; and
the current position of the slider pointer relative to the slider portion changes when the numerical value displayed in the numerical value display portion is changed.

18. The widget of claim 12, further comprising:
a pair of numerical indicators, a first one of the pair of numerical indicators associated with a minimal value of the range of values and positioned relative to a bottom of the slider portion, a second one of the pair of numerical indicators associated with a maximal value of the range of values and positioned relative to a top of the slider portion.

19. The widget of claim 18, wherein the pair of numerical indicators indicate actual minimal and maximal values of the range of values.

20. The widget of claim 18, wherein the pair of numerical indicators indicate percentage values of the range of value relative to the minimal value of the range of values.

21. A graphical user interface comprising at least one of the widgets of claim 12.

22. The widget of claim 12, wherein the appearance of the bottom subportion of the slider portion is uniform within the bottom subportion and visually contrastable from the top subportion of the slider portion.

23. The widget of claim 12, wherein the appearance of the bottom subportion of the slider portion is a shading contrast from the top subportion of the slider portion.

24. A method for displaying a widget of a graphical user interface, the widget associated with a control function having a range of values, the method comprising:
determining the range of values of the control function;
determining a current value and a default value of the control function;
determine relationships between the current value and of the default value to the determined range of values;
displaying a slider portion of the widget;
displaying a slider bar of the widget at a position relative to the slider portion based on the determined relationship between the default value and the determined range of values;
displaying a slider pointer of the widget at a position relative to the slider portion based on the determined relationship between the current value and the determined range of values;
determining an appearance value based on the determined relationship between the current value and the determined range of values; and
altering an appearance of a subportion of the slider portion based on the determined appearance value.

25. The method of claim 24, further comprising altering the current value of the control function, comprising;
selecting the slider pointer; and
altering the position of the slider pointer relative to the slider portion.

26. The method of claim 25, further comprising altering the determined appearance value as the position of the slider pointer relative to the slider portion is altered.

27. The method of claim 24, further comprising displaying a numerical value display portion that includes a numerical value corresponding to the current value of the associated control function and the range of values, an increase value button usable to increase the current value of the associated control function, and a decrease value button usable to decrease the current value of the associated control function.

28. The method of claim 27, further comprising:
altering the current value of the control function, comprising:
selecting the selectable slider pointer, and
altering the current position of the slider pointer relative to the slider portion; and
altering the numerical value displayed in the numerical value display portion when the current position of the slider pointer relative to the slider portion is altered.

29. The method of claim 27, further comprising:
altering the current value of the control function and the numerical value displayed in the numerical value display portion by selecting one of the increase and decrease buttons; and
altering the position of the slider pointer relative to the slider portion changes when the numerical value displayed in the numerical value display portion is altered.

30. The method of claim 24, further comprising displaying a pair of numerical indicators, a first one of the pair of numerical indicators associated with a minimal value of the range of values and positioned relative to a first end of the slider portion, a second one of the pair of numerical indicators associated with a maximal value of the range of values and positioned relative to a second end of the slider portion.

31. The method of claim 24, wherein altering an appearance of a subportion of the slider portion is displaying a shade uniformly within the subportion, wherein the shade contrasts visibly with a remainder subportion of the slider portion.

32. The method of claim 24, wherein altering an appearance of a subportion of the slider portion is shading the subportion to contrast visibly with a remainder subportion of the slider portion.

33. A widget of a graphical user interface, the widget allowing a user to control an associated control function, the widget comprising:
a slider portion, a range of values of the associated control function associated with a first dimension of the slider portion;
a pair of numerical indicators, a first one of the pair of numerical indicators associated with a minimal value of the range of values and positioned relative to a first end of the slider portion, a second one of the pair of numerical indicators associated with a maximal value of the range of values and positioned relative to a second end of the slider portion;
a slider bar extending across the slider portion perpendicularly to the first dimension of the slider portion, the slider bar positioned along the first dimension of the slider portion based on a default value of the associated control function and the range of values; and
a selectable slider pointer positioned adjacent to the slider portion, the slider pointer positioned along the first dimension of the slider portion based on a current value of the associated control function and the range of values, the slider pointer dividing the slider portion into a first subportion extending between a current position of the slider pointer relative to the slider portion and the second end of the slider portion and a second subportion extending between a current position of the slider pointer relative to the slider portion and the first end of the slider portion;

wherein an appearance of the second subportion of the slider portion is determined based on the current value of the associated control function and the range of values.

34. The widget of claim 33, wherein the current value of the control function can be altered by selecting the selectable slider pointer and altering the current position of the slider pointer relative to the slider portion.

35. The widget of claim 34, wherein the appearance of the second subportion of the slider portion changes when the current position of the slider pointer relative to the slider portion is altered.

36. The widget of claim 33, wherein the appearance of the bottom subportion of the slider portion is uniform within the bottom subportion and visually contrastable from the top subportion of the slider portion.

37. The widget of claim 33, wherein the appearance of the bottom subportion of the slider portion is a shading contrast from the top subportion of the slider portion.

38. A widget of a graphical user interface, the widget allowing a user to control an associated control function, the widget comprising:
   a slider portion, a range of values of the associated control function associated with a first dimension of the slider portion;
   a slider bar extending across the slider portion perpendicularly to the first dimension of the slider portion, the slider bar positioned along the first dimension of the slider portion based on a default value of the associated control function and the range of values; and
   a selectable slider pointer positioned adjacent to the slider portion, the slider pointer positioned along the first dimension of the slider portion based on a current value of the associated control function and the range of values, the slider pointer dividing the slider portion into a first subportion extending between a current position of the slider pointer relative to the slider portion and the second end of the slider portion and a second subportion extending between a current position of the slider pointer relative to the slider portion and the first end of the slider portion;
   wherein an appearance of the second subportion of the slider portion is determined based on the current value of the associated control function and the range of values.

39. The widget of claim 38, wherein the current value of the control function can be altered by selecting the selectable slider pointer and altering the current position of the slider pointer relative to the slider portion.

40. The widget of claim 39, wherein the appearance of the second subportion of the slider portion changes when the current position of the slider pointer relative to the slider portion is altered.

41. The widget of claim 38, wherein the appearance of the bottom subportion of the slider portion is uniform within the bottom subportion and visually contrastable from the top subportion of the slider portion.

42. The widget of claim 38, wherein the appearance of the bottom subportion of the slider portion is a shading contrast from the top subportion of the slider portion.

* * * * *